United States Patent
Kummer et al.

(10) Patent No.: US 9,235,981 B2
(45) Date of Patent: *Jan. 12, 2016

(54) BROADCAST COMMUNICATION SYSTEM AND METHOD FOR PROVIDING USERS WITH INFORMATION ASSOCIATED WITH A GEOGRAPHICAL AREA

(75) Inventors: David A. Kummer, Highland Ranch, CO (US); Danny Jean Minnick, Littleton, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 659 days.

This patent is subject to a terminal disclaimer.

(21) Appl. No.: 12/760,928

(22) Filed: Apr. 15, 2010

(65) Prior Publication Data
US 2010/0194984 A1      Aug. 5, 2010

Related U.S. Application Data

(62) Division of application No. 11/693,037, filed on Mar. 29, 2007, now Pat. No. 7,734,246.

(51) Int. Cl.
| | |
|---|---|
| H04N 7/20 | (2006.01) |
| G08B 27/00 | (2006.01) |
| H04H 40/90 | (2008.01) |
| H04N 21/435 | (2011.01) |
| H04H 20/59 | (2008.01) |
| H04H 60/65 | (2008.01) |
| H04H 60/51 | (2008.01) |

(52) U.S. Cl.
CPC ............. *G08B 27/008* (2013.01); *H04H 20/59* (2013.01); *H04H 40/90* (2013.01); *H04H 60/65* (2013.01); *H04N 7/20* (2013.01); *H04N 21/435* (2013.01); *H04H 60/51* (2013.01)

(58) Field of Classification Search
None
See application file for complete search history.

(56) References Cited

U.S. PATENT DOCUMENTS 4,476,488 A * 10/1984 Merrell ................ G08B 27/008
                                                                455/228
5,121,430 A *  6/1992 Ganzer et al. ................. 380/258
(Continued)

OTHER PUBLICATIONS

Amber Alert, Wikipedia, Jun. 21, 2007, http://en.wikipedia.org/w/index.php?title=Amber_Alert, 5 pages.
(Continued)

*Primary Examiner* — Jonathan V Lewis
(74) *Attorney, Agent, or Firm* — Ingrassia Fisher & Lorenz, P.C.

(57) ABSTRACT

A method is presented for providing information associated with a geographical area to users of broadcast communication receivers. The information, as well as an indication of the geographical area associated with the information, are transmitted to, and received by, each of the broadcast communication receivers. In each of the receivers, the indication of the geographical area is compared with a geographic code associated with, and stored within, the receiver. Each of the receivers transfers the information in a video format to the user of the receiver if the geographic code indicates that the receiver is located within the geographical area.

2 Claims, 5 Drawing Sheets

(56) References Cited

U.S. PATENT DOCUMENTS

| | | | | |
|---|---|---|---|---|
| 5,432,542 | A * | 7/1995 | Thibadeau et al. | 725/35 |
| 5,619,274 | A * | 4/1997 | Roop et al. | 348/461 |
| 5,917,887 | A | 6/1999 | Fesler et al. | |
| 6,009,116 | A * | 12/1999 | Bednarek et al. | 375/130 |
| 6,139,197 | A * | 10/2000 | Banks | 709/217 |
| 6,477,504 | B1 * | 11/2002 | Hamlin et al. | 705/7.32 |
| 6,543,051 | B1 * | 4/2003 | Manson | G08B 27/008 348/461 |
| 6,647,548 | B1 * | 11/2003 | Lu et al. | 725/20 |
| 6,686,880 | B1 | 2/2004 | Marko et al. | |
| 6,711,379 | B1 * | 3/2004 | Owa et al. | 455/3.01 |
| 6,782,392 | B1 | 8/2004 | Weinberger et al. | |
| 6,785,904 | B1 * | 8/2004 | Franken et al. | 725/54 |
| 7,103,770 | B2 * | 9/2006 | Conrath | 713/155 |
| 7,251,318 | B1 | 7/2007 | Henderson | |
| 7,343,177 | B2 | 3/2008 | Seshadri et al. | |
| 7,629,882 | B2 | 12/2009 | Farah et al. | |
| 7,720,431 | B2 * | 5/2010 | Lee | 455/3.01 |
| 7,734,246 | B2 | 6/2010 | Kummer | |
| 8,041,332 | B2 | 10/2011 | Kummer | |
| 8,213,897 | B2 | 7/2012 | Hofmann | |
| 2002/0087967 | A1 * | 7/2002 | Conkwright et al. | 725/1 |
| 2003/0097654 | A1 * | 5/2003 | Franken et al. | 725/1 |
| 2003/0169185 | A1 * | 9/2003 | Taylor | 340/945 |
| 2004/0192189 | A1 * | 9/2004 | Yuhara et al. | 455/3.02 |
| 2004/0221305 | A1 * | 11/2004 | Broussard et al. | 725/38 |
| 2005/0102696 | A1 * | 5/2005 | Westberg | 725/46 |
| 2005/0166222 | A1 * | 7/2005 | Tully Jr. et al. | 725/33 |
| 2006/0015915 | A1 * | 1/2006 | Yun | 725/108 |
| 2006/0020992 | A1 | 1/2006 | Pugel et al. | |
| 2008/0059998 | A1 * | 3/2008 | McClenny | H04N 7/163 725/33 |
| 2008/0120639 | A1 * | 5/2008 | Walter et al. | 725/33 |
| 2008/0168524 | A1 * | 7/2008 | Wood et al. | 725/134 |
| 2008/0242328 | A1 | 10/2008 | Kummer | |
| 2009/0228914 | A1 * | 9/2009 | Wong et al. | 725/32 |
| 2010/0199303 | A1 | 8/2010 | Kummer | |
| 2011/0207395 | A1 | 8/2011 | Kummer | |
| 2014/0165091 | A1 * | 6/2014 | Abhyanker | 725/27 |

OTHER PUBLICATIONS

Emergency Alert System, Wikipedia, Jun. 21, 2007, http://en.wikipedia.org/w/index.php?title=Emergency_Alert_System, 6 pages.

NOAA Weather Radio All Hazarads, Wikipedia, Jun. 21, 2007, http://en.wikipedia.org/wiki/NOAA_Weather_Radio_All_Hazards, 8 pages.

Office Action dated Sep. 16, 2009, U.S. Appl. No. 12/761,061, 12 pages.

Amendment and Response to Office Action dated Dec. 16, 2009, 14 pages.

Office Action dated Sep. 10, 2010, U.S. Appl. No. 12/761,061, 10 pages.

Amendment and Response to Office Action dated Jan. 6, 2011, 11 pages.

Notice of Allowance and Fee(s) Due dated Feb. 2, 2011, U.S. Appl. No. 12/761,061, 6 pages.

Request for Continued Examination dated May 2, 2011, U.S. Appl. No. 12/761,061.

Notice of Allowance and Fee(s) Due dated Jun. 20, 2011, U.S. Appl. No. 12/761,061, 8 pages.

Office Action dated Sep. 16, 2009, U.S. Appl. No. 11/693,037 10 pages.

Amendment and Response to Office Action dated Dec. 16, 2009, U.S. Appl. No. 11/693,037, 14 pages.

Notice of Allowance and Fee(s) Due dated Feb. 25, 2010, 5 pages.

Office Action dated Oct. 20, 2011, U.S. Appl. No. 13/100,266, 9 pages.

Amendment and Response to Office Action dated Dec. 20, 2011, U.S. Appl. No. 13/100,266, 6 pages.

Notice of Allowance and Fee(s) Due dated Jan. 10, 2011, U.S. Appl. No. 13/100,266, 8 pages.

USPTO "Non-Final Office Action" mailed Jun. 29, 2012 for U.S. Appl. No. 13/458,105, filed Apr. 27, 2012.

USPTO "Notice of Allowance" mailed Dec. 4, 2012 for U.S. Appl. No. 13/458,105, filed Apr. 27, 2012.

* cited by examiner

BROADCAST COMMUNICATION SYSTEM AND METHOD FOR PROVIDING USERS WITH INFORMATION ASSOCIATED WITH A GEOGRAPHICAL AREA

CROSS-REFERENCE TO RELATED APPLICATIONS

This application is a divisional application of U.S. patent application Ser. No. 11/693,037, entitled "BROADCAST COMMUNICATION SYSTEM AND METHOD FOR PROVIDING USERS WITH INFORMATION ASSOCIATED WITH A GEOGRAPHICAL AREA" and filed Mar. 29, 2007, which is hereby incorporated herein by reference in its entirety.

BACKGROUND

Nationally-oriented radio and television broadcast programming, such as national newscasts, major sporting events, motion picture presentations, and weekly entertainment programs, have been available for many years. However, such programming typically has been delivered to the consumer by way of a plurality of locally-situated broadcast facilities. For example, radio or television programs of national interest are often broadcast by way of many radio or television stations of local broadcast scope collectively forming a terrestrial wireless broadcast network. Each broadcast station may have an effective range of up to a hundred miles or more, depending on applicable governmental regulations, technical capabilities of the station, and other factors. Of course, each of these stations may also provide more locally-oriented programming, such as local newscasts and sporting events, of primary interest to consumers residing within the station broadcast area.

In addition to normal programming, this infrastructure of networks in the United States also had been employed as part of the federal Emergency Broadcast System (EBS) starting in 1963, which was replaced beginning in 1994 with the current Emergency Alert System (EAS). EAS allows the transmission of messages of national importance under the guidance of the President of the United States, although the system has never been used officially for that purpose. However, EAS is quite often employed at a state and local level for transmission of weather bulletins, child abduction warnings (i.e., "AMBER alerts"), and other time-sensitive events of a local nature. With each of the broadcast stations typically servicing a localized area, the use of such stations for dissemination of locally-oriented EAS alerts and other information is advantageous, since local information generally is not provided to distant geographic areas unaffected by, or uninterested in, the alert.

The development of cable television systems altered the broadcast landscape somewhat, as channels providing purely regional, national, or international programming began to be delivered alongside local television station signals to consumers connected to the system. Thus, even though each separate cable television system typically covers an operating area approximately equivalent to a local television station, providing weather alerts and other important local information to all users of the cable system became more problematic. More specifically, in order to provide geographically-specific information to the surrounding community, the information provided by the local television stations, and passed through by the cable system, had to be supplemented to address the situation in which a consumer was viewing a nationally-oriented channel instead of local programming. In response, cable operators have devised ways to provide the alert information through all of the channels it provides. For example, the cable operator temporarily may block all programming on all channels, or at least the regionally- and nationally-oriented channels, to provide the local alert directly by way of text delivery, audio delivery, or both on every channel. In addition, the information may direct the viewer to tune to a specific cable system channel to access more details regarding the alert.

However, the deployment of broadcast communication systems of national scope or greater, such as current satellite radio (SR) and digital broadcast satellite (DBS) television systems, have further confused the issue. The U.S. government has required such systems to receive and disseminate nationally-oriented EAS messages starting May 31, 2007. However, alerts and other information of a more local nature are much more prevalent, as described above. While DBS television systems now often provide programming from television stations in the local area in their channel line-up, the problem of notifying a viewer tuned to a national channel remains. Further, given that many DBS satellites provide programming to consumers across a wide service area, including one or more entire countries, delivering all locally-oriented information generated within the service area to all users within the area is impractical. For example, given the rather voluminous nature of such information typically transmitted within the U.S. in a given timeframe, the typical viewer may either fail to notice the particular information associated with his or her particular area, or otherwise ignore all of the information being received.

DETAILED DESCRIPTION

Figure 1:
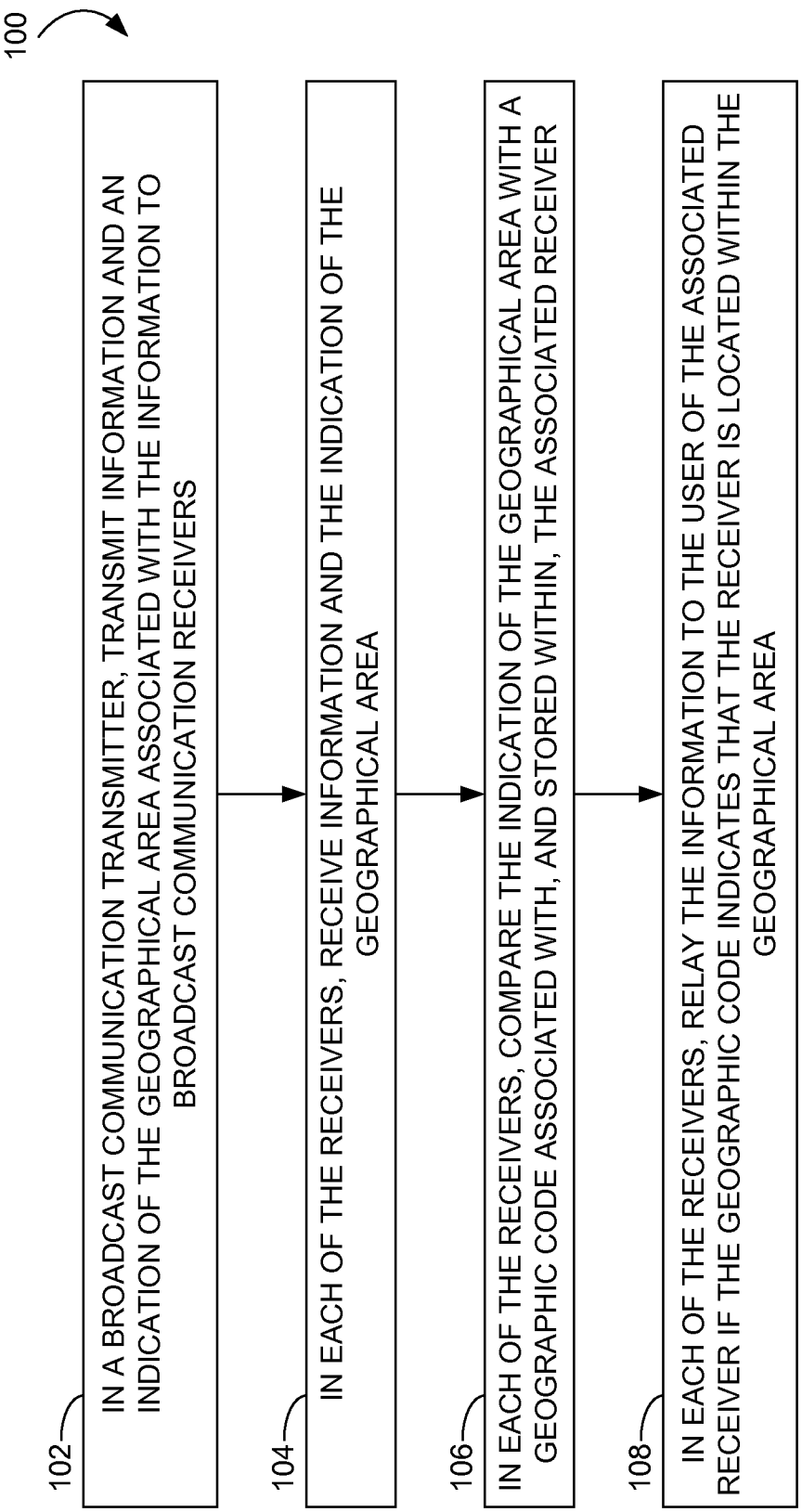
FIG. 1 is a flow diagram of a method according to an embodiment of the invention for providing information associated with a geographical area to users by way of broadcast communication receivers.

FIG. 1 provides a flow diagram of a method 100 for providing information associated with a geographical area to users by way of broadcast communication receivers. In the method 100, the information and an indication of the geographical area associated with the information is transmitted from a broadcast communication transmitter to the broadcast communication receivers (operation 102). The information and the indication of the geographical area are received in each of the broadcast communication receivers (operation 104). In each of the receivers, the indication of the geographical area is compared with a geographic code associated with, and stored within, the associated receiver (operation 106). Each receiver then relays the information to the user of the receiver if the geographic code indicates that the receiver is located within the geographical area (operation 108).

Figure 2:
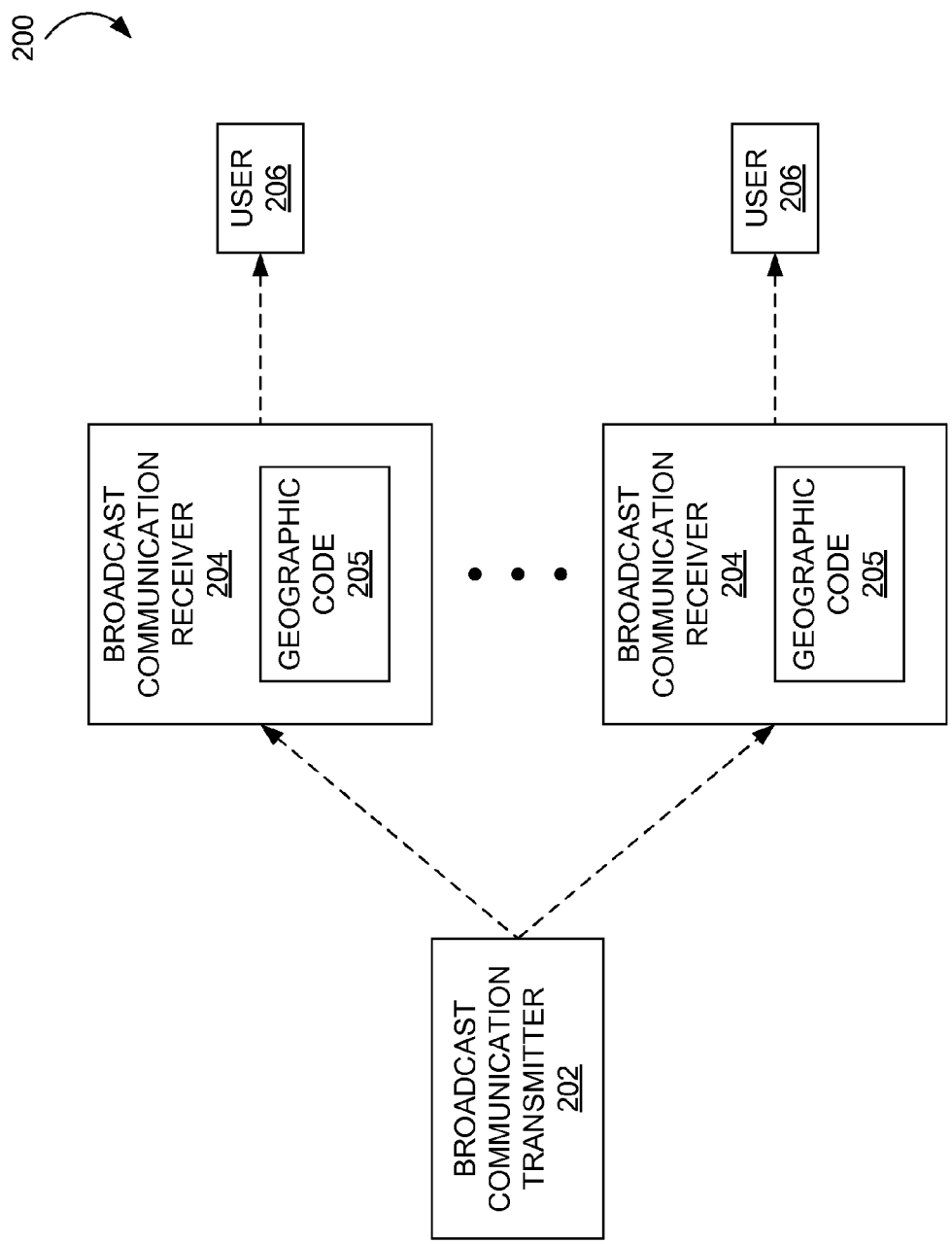
FIG. 2 is a block diagram of a broadcast communication system according to an embodiment of the invention for providing information associated with a geographical area.

Another embodiment, a broadcast communication system 200, is depicted in FIG. 2. The system 200 includes a broadcast communication transmitter 202 and a plurality of broadcast communication receivers 204. The broadcast communication transmitter 202 is configured to transmit information associated with a geographical area and an indication of the geographical area. Each of the broadcast communication receivers 204 is configured to receive the information and the indication of the geographical area from the broadcast transmitter 202. Further, each of the receivers 204 is configured to compare the indication of the geographical area with a geographic code 205 associated with, and stored within, the associated receiver 204. For each receiver 204, if the geographic code 205 indicates that the receiver 204 is located within the geographical area, the receiver 204 is configured to relay the information to a user 206 associated with the receiver 204. Each broadcast communication receiver 204 represents yet another separate embodiment of the invention.

Figure 3:
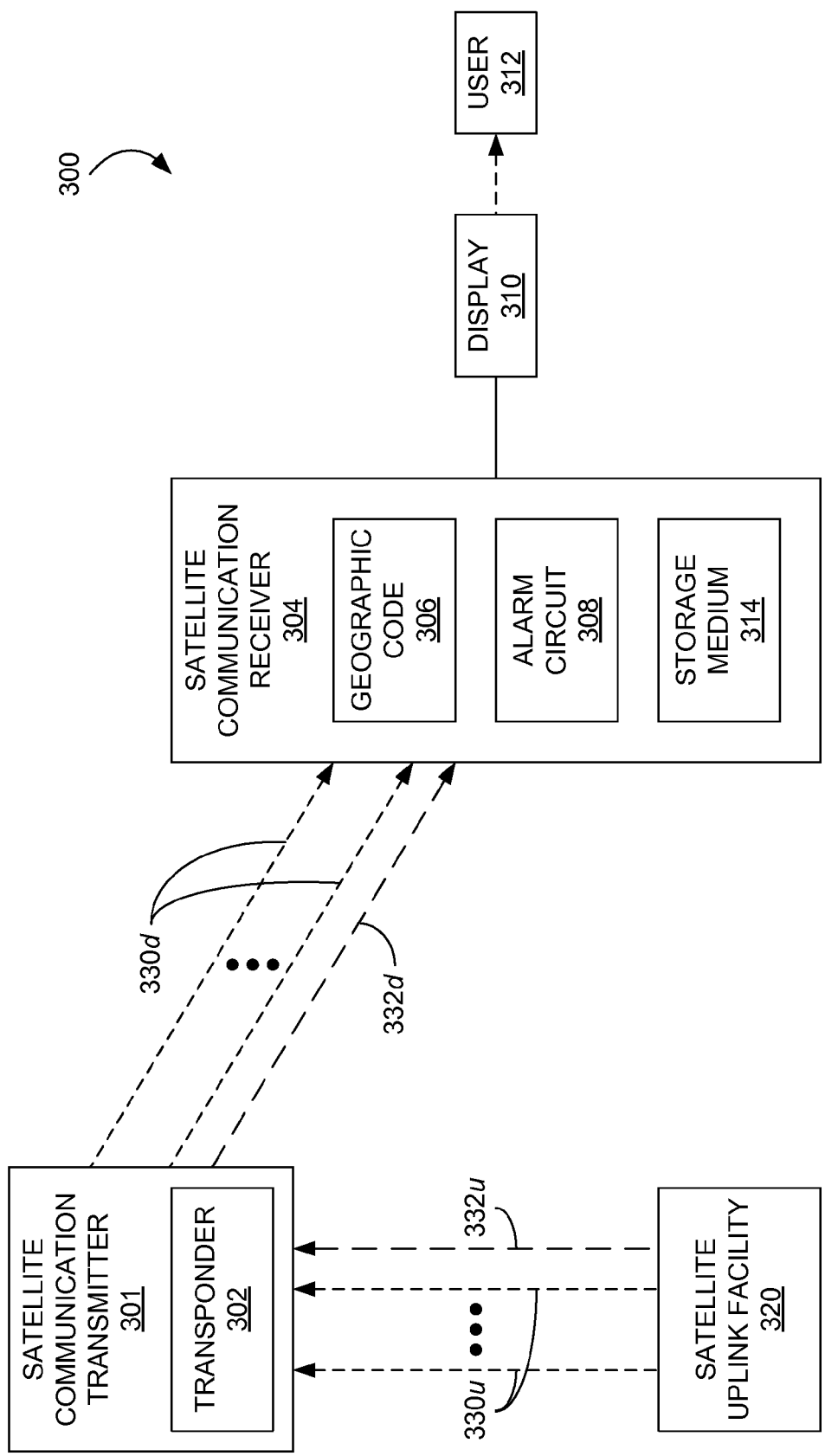
FIG. 3 is a block diagram of a broadcast communication system according to another embodiment of the invention involving direct broadcast satellite communications.

Another embodiment of the invention—a satellite communication system 300—is depicted in the block diagram of FIG. 3. Generally, the system 300 includes a satellite communication transmitter 301 residing on a satellite, and a plurality of satellite communication receivers 304. Only one of the receivers 304 is shown explicitly in FIG. 3 to simplify the following discussion. One particular term often used for such a receiver 304 is a "set-top box," although other terms referencing the receiver 304 have also been utilized. While the following discussion focuses exclusively on embodiments of the invention within the context of satellite broadcast transmitters and receivers, equipment involved in the reception of other forms of communication, such as various types of wireline and wireless communication, may also benefit from application of the embodiments discussed below. In addition, the satellite communication receiver 304 represents just one particular example of such a receiver; many variations of the configuration discussed below are possible while still benefiting from various aspects of the embodiments discussed herein.

In the embodiment of FIG. 3, the satellite communication transmitter 301 includes one or more transponders 302, with each transponder 302 capable of receiving and transmitting a number of broadcast programming channels 330 and a data channel 332. More specifically, each of the broadcast programming channels 330 may be represented as a broadcast programming uplink channel 330$u$ from a satellite uplink facility 320 to the satellite communication transmitter 301, and a broadcast programming downlink channel 330$d$ from the transmitter 301 to each of the receivers 304. Similarly, the data channel 332 may be represented as a data uplink channel 332$u$ from the satellite uplink facility 320 to the transmitter 301, and a data downlink channel 332$d$ from the transmitter 301 to the receivers 304. The data channel 332 may provide control and status information regarding the satellite communication system 300 in general, as well as the subscription status of each of the receivers 304 receiving the broadcast programming channels 330. The subscription status may include, for example, the identity of the channels 330 each receiver 304 is authorized to receive, as well as program guide information detailing the various programming offerings being supplied over the programming channels 330 in the near future. In another embodiment, the information provided by way of the data channel 332 may be embedded within the programming transferred over the programming channels 330, thus reducing or eliminating the need for a separate data channel 332.

The satellite communication transmitter 301 receives the broadcast programming channels 330 and the data channel 332 from a terrestrial-based satellite uplink facility 320. In turn, the uplink facility 320 may receive the video and audio information for the programming channels 330 by way of terrestrial- or satellite-based communications from the various content providers supplying the programming to the satellite communication system 300.

The programming channels 330 and the data channel 332 transmitted via the transponder 302 of the satellite communication transmitter 301 are received by each of a number of the satellite communication receivers 304. Typically, each receiver 304 receives the channels 330, 332 by way of an antenna or "dish" (not shown in FIG. 3) coupled with the associated receiver 304. In some embodiments, the receiver 304 is also configured to decrypt and decode any information in the programming and data channels 330, 332 that the receiver 304 is authorized to receive. The programming is then relayed to a user 312 associated with the receiver 304 by way video and audio signals transferred to a display 310, which in one example may be a television or monitor.

Figure 4:
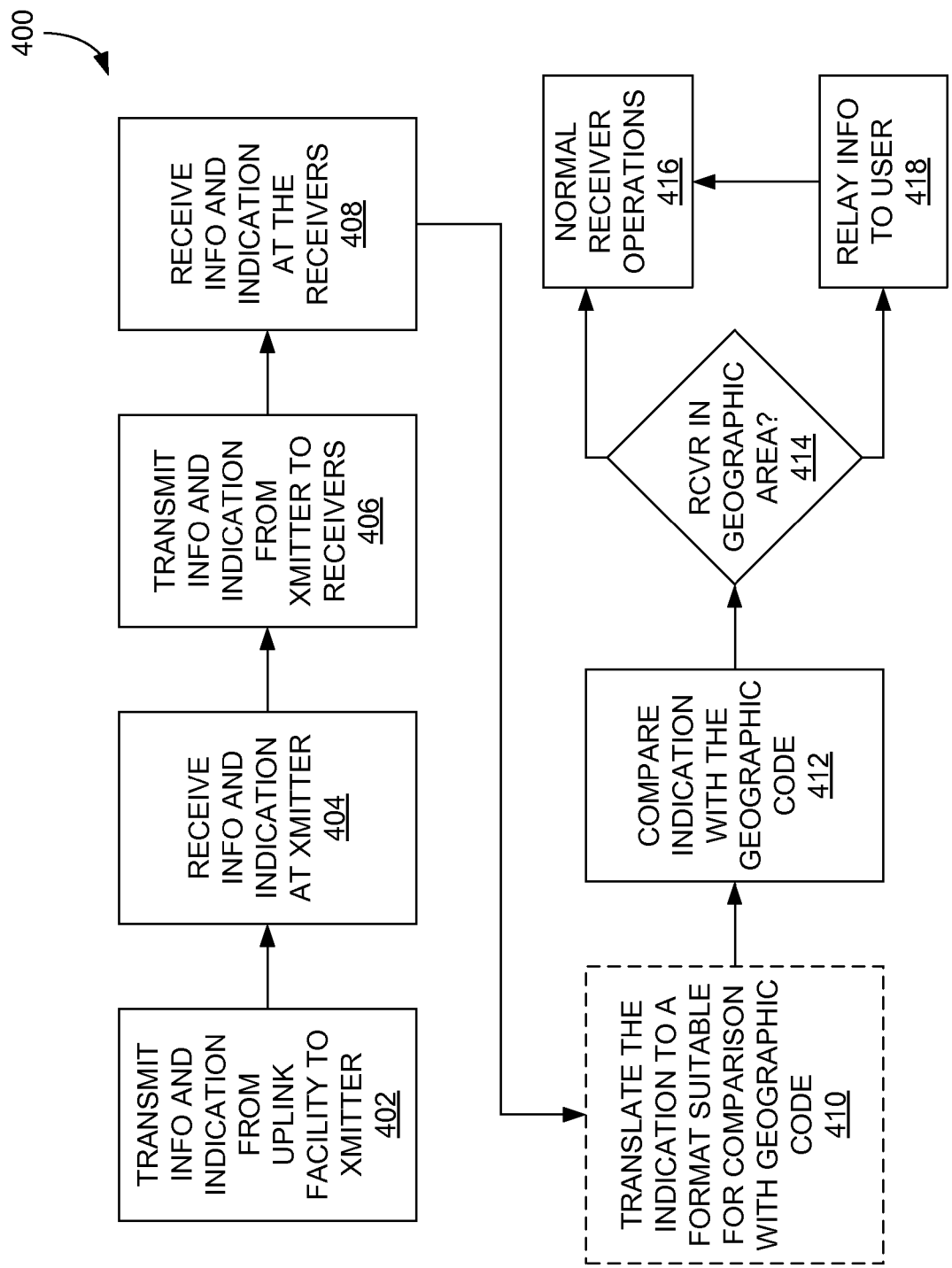
FIG. 4 is a flow diagram of a method according to another embodiment of the invention for providing information associated with a geographical area by way of the broadcast communication system of FIG. 3.

FIG. 4 provides a flow diagram of a method 400 for providing information associated with a geographical area to users 312 by way of the satellite communication system 300 of FIG. 3. The information may be any information associated with or corresponding to a particular geographic area within which less than all of the receivers 304 are located. In one embodiment, the information may be related to, or received by way of, the Emergency Alert System (EAS) described above. For example, the information may be a weather warning, such as a severe thunderstorm or tornado warning applicable to one or more portions of one or more counties of one or more states. In another case, the information may be an AMBER alert or similar notice regarding an abduction perpetrated within a particular metropolitan area. Other time-sensitive or time-critical information of a life-saving or life-protecting nature, such as a national or regional emergency, may also be involved in other implementations.

Further, other information of a less critical nature may be relayed to the user 312 as well. For example, the information may be a notification of a local or community event. In another implementation, the information may be upcoming satellite programming events of particular interest to users 312 residing with a particular geographic area. In another embodiment, the information may be traffic information and alerts concerning highways and major roads local to the user 312. In these and similar embodiments involving non-emergency information, the user 312 may be able to select which types of information are to be displayed, such as by way of a menu item provided by the receiver 304 by way of the display 310.

As set forth in FIG. 4, the information associated with a geographical area, along with an indication of the geographical area, is transmitted from the satellite uplink facility 320 to the satellite transmitter 301 (operation 402). In one embodiment, the information and the indication of the geographical area are transmitted over the data channel 332 between the uplink facility 320 and the transmitter 301, as described above. In the absence of a data channel 332, the information may be transferred over one of the broadcast programming channels 330 or another communication link not shown in FIG. 3.

Before being transmitted to the transmitter 301, the information and the indication of the geographic area may be supplied to the uplink facility 320 by any of a number of sources, depending on the nature of the information. For one, weather-related EAS alerts may be provided by way of an office of the National Weather Service. Similarly, a law enforcement office may generate an AMBER alert that is ultimately forwarded to the uplink facility 320 for distribution to satellite communication receivers 304 located in a geographic area surrounding the site of the abduction. In other situations, such as the dissemination of programming information related to a local area, the information and the indication of the area may be generated at the uplink facility 320 or another site associated with the communication service provider.

The geographic area associated with the information may encompass any of a number of areas serviced by the satellite communication system 300. In one embodiment, the geographic area may be a nation, a state, a county, a city, an area identified with a postal code (i.e., a ZIP code), or any combination thereof. In one particular example, the geographic area may be a county or portion of a county as defined in EAS weather-related alerts. In another example, the geographic area may be defined by means other than governmental or geopolitical boundaries, such as rivers, mountain ranges, or other naturally-occurring barriers. In yet another implementation, the geographic area may be defined by way of a set of coordinates, such as a latitude and a longitude, possibly with the addition of a radius thereabout, thus defining a circular region.

After the satellite transmitter 301 receives the information and the indication of the associated geographical area (operation 404), the transmitter 301 transmits or forwards the information and the indication of the geographical area to each of a number of the satellite communication receivers 301 (operation 406). As above, the information and the indication of the geographical area are transmitted over the data channel 332 in one embodiment, although other methods of transfer are possible.

At each satellite communication receiver 304, after the information and the indication of the geographical area are received therein (operation 408), the receiver 304 compares the indication of the geographical area with a geographic code 306 associated with, and stored within, the receiver 304 (operation 412). Similar to the indication of the geographical area, the geographic code 306 may be a code representing one or more of a nation, a state, a county, a city, a postal or ZIP code area, or any combination thereof. In other embodiments, the geographic code 306 may represent an area other than a governmental or geopolitical border, such as a naturally-bounded terrestrial area. Also, the geographic code 306 may represent a latitude and longitude, possibly along with a radius, or some other set of coordinates.

In one embodiment, the geographic code 306 may be of the same format as the indication of the geographic area associated with the received information. As a result, the indication may be compared as is with the geographic code (operation 412) to determine if the associated receiver 304 is located within the geographic area (operation 414). If, instead, the indication is of a different format from that of the geographic code 306, the indication may be translated to a format more suitable for the subsequent comparison with the geographic code 306 (operation 410). For example, presuming the geographic code 306 is a ZIP code, and the indication of the geographic area associated with the information is provided in a county format such as that used for many EAS weather-related alerts, the receiver 304 may first convert the county format to a number of ZIP codes that may then be compared directly with the geographic code 306. In another embodiment, any translation of the indication of the geographic area may be performed at the satellite communication transmitter 301, which may provide a more cost-effective and time-efficient solution than performing the translation at each of the receivers 304.

The geographic code 306 within each receiver 304 may be generated in a number of ways. In one embodiment, the code 306 may be programmed in a memory of the receiver 304 at the time the receiver is purchased or leased from the provider of the satellite communication receiver 300. The code 306 may be a ZIP code or other geographic indication of the home address of the user. In another example, the geographic code 306 may be programmed remotely via the satellite communication transmitter 301 by way of the data channel 332. Such programming may occur in response to the service provider authorizing the receiver 304 on behalf of the user 312 to receive programming provided through the transmitter 301. Further, the memory holding the geographic code 306 may be a nonvolatile memory permanently residing within the receiver 304, or a "smart card" or similar removable memory device typically employed to store cryptographic information for decrypting programming to which the user 312 has subscribed. In another embodiment, the receiver 304 may determine the geographic code 306 by way of a Global Positioning System (GPS) receiver (not shown in FIG. 3) coupled with, or integrated within, the receiver 304. This particular embodiment addresses situations in which the user 312 relocates the receiver 304 to another geographic area over a significant distance.

Figure 5:
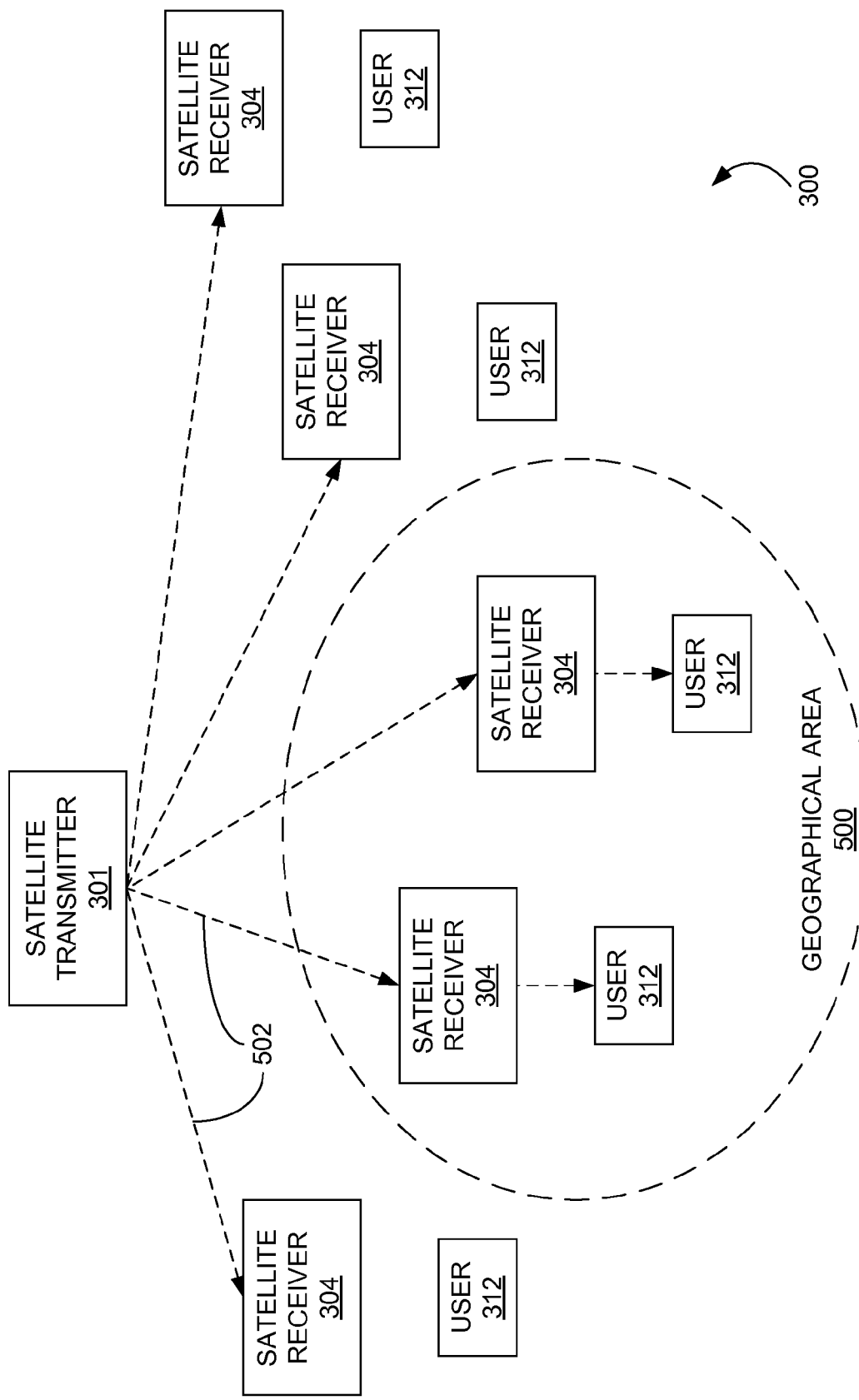
FIG. 5 is a graphical representation of the broadcast communication system of FIG. 3 in operation according to an embodiment of the invention.

Referring again to FIG. 4, if the receiver 304 is not determined to be located within the indicated geographical area (operation 414) on the basis of the comparison between the indication of the geographical area and the geographic code 306, the information is not relayed to the user, and normal operations of the receiver 304 continue (operation 416). On the other hand, if the receiver 304 is located within the indicated geographical area, the information is first relayed to the user (operation 418). Accordingly, only those users 312 located within the indicated geographical area should receive the associated information. FIG. 5 provides a graphical representation of this result, in which the transmitter 301 transmits information 502 pertaining to a particular geographical area 500, but only those receivers 304 located within the geographical area 500 relays the information to their associated users 312.

In the embodiment of FIG. 3, the information is presented to the user 312 of the receiver 304 via the display 310 coupled with the receiver 304. For example, the information is displayed along with a video signal of programming being viewed by the user 312 at that time. In one particular implementation, the information is displayed as text in a video format provided as a "scroll" or "crawl" at the top or bottom of the viewable portion of the display 310 while the programming being viewed by the user 312 continues to be shown. Depending on the specific embodiment, the text may be overlaid atop the programming being viewed, or the programming may be reduced in scale on the display 310 to make room for the text so that none of the programming being viewed is obscured by the text.

The information may also include audio information to be played over one or more audio speakers of the display 310. In one example, any audio associated with the programming being viewed by the user 312 may be muted or reduced in volume while the audio portion of the information is played.

Typically, the user 312 may be viewing programming from the transmitter 301 being received over one of the programming channels 330 at the time the information is being relayed to the user 312. In another case, the user 312 may be viewing programming previously received from the transmitter 301 over one of the programming channels 330 and stored on a storage medium 314 located within the receiver 304. In either case, the information may be relayed to the user 312 while the user 312 views the programming on the display 310. In addition, the information may be prevented from being incorporated or combined with programming concurrently being stored on the storage medium 314 but not transferred to the display 310 for viewing at the time the information is received at the receiver 304. In another example, the information may be exhibited on the display 310 while the user 312 is accessing menu functions, perusing a programming guide, or accessing other functions of the receiver 304 not directly associated with the viewing of programming.

Under another scenario, the satellite communication receiver 304 may be in a "standby mode" at the time the information related to the geographical area of the receiver 304 is to be relayed to the user 312. In that case, the standby mode would allow the receipt of both the information to be relayed and the indication of the associated geographical area while significant portions of the receiver 304 are inactive. For example, the user 312 may be engaged in some activity other than viewing programming via the receiver 304, or may have retired for the evening, thus not requiring the use of the receiver 304. Similarly, the receiver 304 may be in a fully operational mode, but the corresponding display 310 may be powered down, or the user 312 may not be located near the display 310 at the time the information is being relayed. To address these circumstances, the receiver 304 may include an audible alarm circuit 308 which may be activated to emit an audible sound to attract the attention of the user 312. In response, the user 312 may react by returning the receiver 304 to the fully operational mode and turning on the associated display 310, if necessary, to learn more about the information being received from the transmitter 301. The audible alarm circuit 314 may be a speaker with associated driver circuitry, a piezoelectric alarm circuit, or another circuit or device capable of emitting an audible sound or tone from the receiver 304.

As described above, various embodiments of the present invention provide the ability to relay information associated with a geographic area to users by way of broadcast communication receivers. This information may be of a time-critical nature, such as an EAS message, or of a less-serious tenor, such as information regarding community events or programming information. The information intended for users residing within the associated geographical area is generally relayed only to those users, even though other users located well outside that geographical area may be receiving the same programming and related information from the same broadcast communication transmitter.

Embodiments of the present invention may be embodied in electronic hardware, software, or some combination thereof located within the broadcast communication receivers and transmitters described above. Such software may include instructions executable by one or more processors located and operating within each of the receivers and transmitters discussed herein.

While several embodiments of the invention have been discussed herein, other embodiments encompassed by the scope of the invention are possible. For example, while some embodiments of the invention are described above in specific reference to satellite broadcast communications, other communication systems, devices, and methods involving other forms of communication, such as wireline, wireless, or optical communications, may benefit from application of the concepts described herein. For example, satellite radio (SR) communication systems may employ many of the principles discussed above to significant benefit of the user. Also, aspects of one embodiment may be combined with those of alternative embodiments to create further implementations of the present invention. Thus, while the present invention has been described in the context of specific embodiments, such descriptions are provided for illustration and not limitation. Accordingly, the proper scope of the present invention is delimited only by the following claims.

What is claimed is:

1. A method for providing an emergency alert associated with a geographical area to a user of a satellite set-top box receiver, the method comprising:
  receiving, at a satellite signal reception dish or antenna unit coupled with the satellite set-top box receiver, the emergency alert and an indication of the geographical area associated with the emergency alert;
  transferring the emergency alert and the indication of the geographical area into the satellite set-top box receiver, wherein the satellite set-top box receiver is located at a home of the user that is associated with a postal address;
  comparing, at the satellite set-top box receiver, the indication of the geographical area with a geographic code that is associated with the postal address associated with the home of the user and that is stored within non-volatile memory of the satellite set-top box receiver, wherein the geographic code comprises at least a zip code of the postal address; and
  transferring, from the satellite set-top box receiver, the emergency alert to a display device that is associated with the satellite set-top box receiver if the geographic code indicates a location that is located within the geographical area, but not transferring the emergency alert to the display device if the geographic code indicates a location that is not located within the geographical area; and
  wherein the method further comprises: simultaneously with receiving the emergency alert, receiving television programming at the satellite signal reception dish or antenna unit, simultaneously with transferring the emergency alert, transferring the television programming to the satellite set-top box receiver, and regardless of whether the emergency alert is transferred to the display device, transferring the television programming to the display device, with the proviso that if the emergency alert is transferred to the display device, the transferring of the emergency alert and the television programming to the display device is performed simultaneously, and
  wherein the indication of the geographical area is in county-code format and the geographic code is in zip-code format, and wherein the method further comprises translating the county-code format geographical area into zip-code format prior to the comparing.

2. The method of claim 1, further comprising transferring the television program to a programming storage device associated with the satellite set-top box receiver for later access by the user, with the proviso that the emergency alert is not transferred to the programming storage device.

* * * * *